United States Patent
Guena et al.

[11] Patent Number: 5,233,353
[45] Date of Patent: Aug. 3, 1993

[54] SYSTEM FOR MEASURING THE DISTANCE BETWEEN TWO STATIONS MOBILE WITH REGARD TO ONE ANOTHER

[75] Inventors: Jean Guena, Trebeurden; Jean-Claude Leost, Perros Guirec; Sylvain Meyer, Callac, all of France

[73] Assignee: France Telecom, Paris, France

[21] Appl. No.: 947,678

[22] Filed: Sep. 15, 1992

[30] Foreign Application Priority Data

Sep. 18, 1991 [FR] France ............... 91-11470

[51] Int. Cl.$^5$ ............ H01Q 21/06; G01S 13/08
[52] U.S. Cl. ..................... 342/125; 342/42; 342/51
[58] Field of Search ............. 342/125, 51, 42

[56] References Cited

U.S. PATENT DOCUMENTS 4,278,977  7/1981  Nossen ................ 342/42
4,959,645  9/1990  Guena et al. .
4,983,976  1/1991  Ogata et al. ............ 342/42
5,164,719  11/1992  Guena et al. ........... 342/42 X

*Primary Examiner*—Mark Hellner
*Attorney, Agent, or Firm*—Laubscher & Laubscher

[57] ABSTRACT

An emitted wave is transmitted from a central station to a passive end. A phase modulation circuit in the passive end modulates a signal resulting from the emitted wave for retransmitting it in the form of a two-phase-state modulated signal at the rhythm of a clock signal. In the central station, the modulated signal is demodulated into two quadrature signals. On the basis of the product of the two quadrature signals and the sign of the difference between the moduli of the rectified quadrature signals, the count of an up-down counter in a digital processing circuit is incremented or decremented in order for said count to be representative of the distance separating the passive end and the central station.

7 Claims, 6 Drawing Sheets

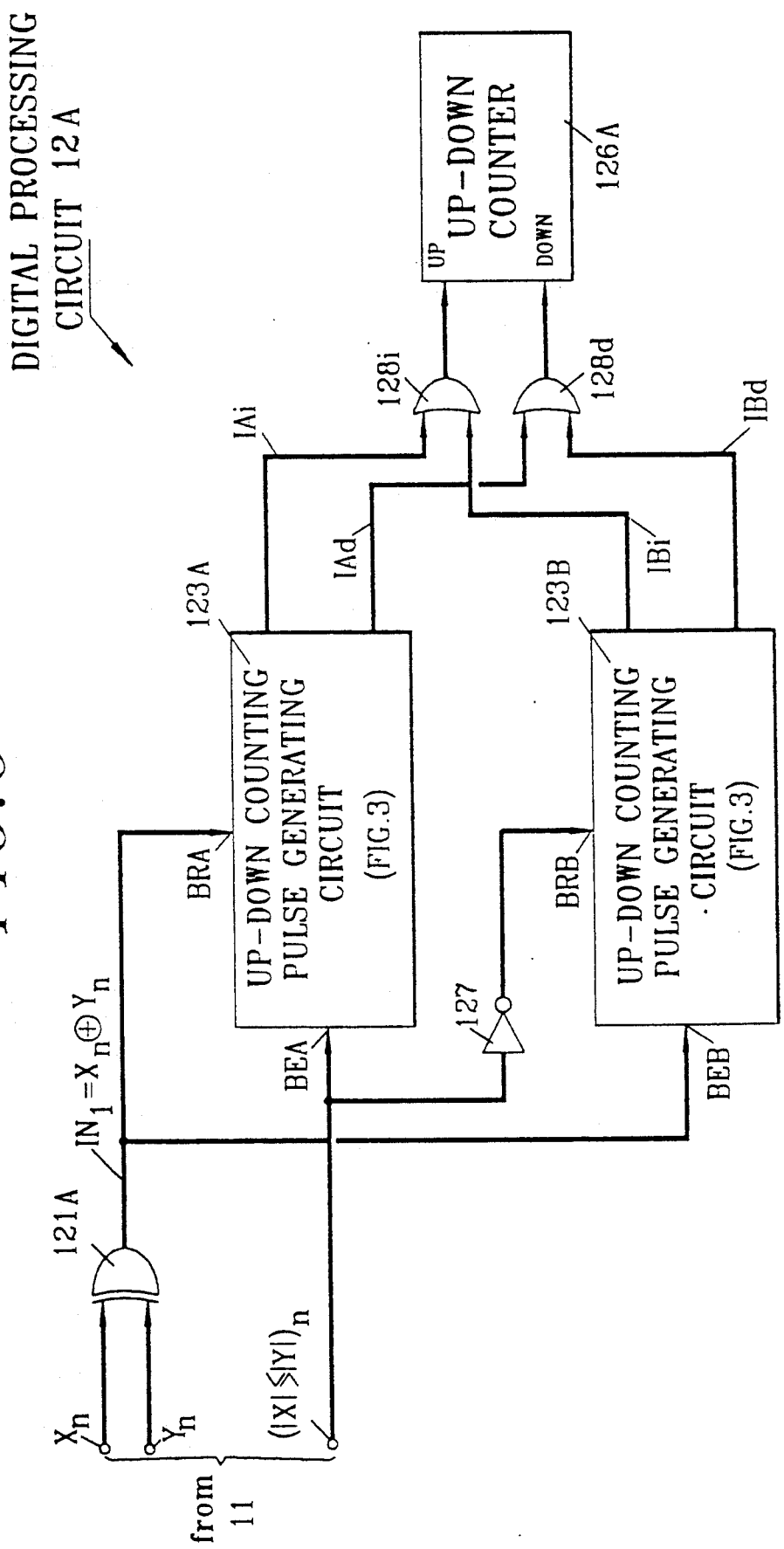

SYSTEM FOR MEASURING THE DISTANCE BETWEEN TWO STATIONS MOBILE WITH REGARD TO ONE ANOTHER

BACKGROUND OF THE INVENTION

1. Field of the Invention

The present invention relates in general to a system for measuring the distance between a central station and one or plural terminal stations that are mobile with regard to the central station, circuits for performing this measurement being included partly in the central station and partly in each terminal station.

In such a distance measurement system, the central station must be capable, by emitting microwaves towards a terminal station, of determining the variable distance separating it from said terminal station.

2. Description of the Prior Art

According to the prior art, the central station measures the distance between the two stations by emitting microwaves towards the terminal station and by detecting waves reflected by said terminal station. The distance separating the stations is calculated as a function of the product of a delay between the instant of emission and the instant of reception of the reflected waves by the propagation velocity of said waves. For instance, an embodiment of a central station using such a relation includes an emitter emitting a microwave of variable frequency, with the frequency varying in sawtooth manner. At instants $t_0$, $t_1$, ... corresponding to minimum emission frequencies, a microwave "pulse" is emitted by the central station to a target. During the emission and reflection propagation times, the frequency of the microwave produced by the emitter has increased linearly, and at the instant of reception of the reflected wave, it is possible to deduce a distance from a difference in frequency $\Delta f$ between the emission frequency and the frequency generated by the emitter at the instant of reception.

Other embodiments exist, but always require complex and expensive circuits, restricting applications to privileged sectors.

OBJECT OF THE INVENTION

The main object of this invention is particularly to provide a distance measurement system using a known phase-modulation radio link between the stations thereby deriving first and second pulses which are representative of the phase variation, in sign and magnitude, of demodulated signals in the central station, the phase variation depending on the distance between the stations.

The invention is applicable in various fields, such as guidance, centering, positioning of mechanical parts; approach detection;
anti-collision detection for vehicles;
assistance with docking manoeuvres for ships;
level indications for water towers, locks or elevators.

SUMMARY OF THE INVENTION

Accordingly, there is provided a system for measuring a distance between first and second stations mobile with regard to one another.

The second station comprises means for modulating a carrier signal emitted from the first station by a digital signal into a two-phase-state modulated signal which is transmitted to the first station.

The first station comprises:
means for demodulating and filtering the two-phase-state modulated signal into two phase-quadrature demodulated and filtered signals,
means for deriving a first logic signal having logic levels dependent on the sign of a product of the two phase-quadrature demodulated and filtered signals,
means for deriving a second logic signal having logic levels dependent on the sign of the difference of the moduli of the phase-quadrature demodulated and filtered signals,
first means for generating first and second pulses respectively
in response to first and second transitions in one of the first and second logic signals respectively when the other one of the first and second logic signals is at first and second logic levels, and
in response to the first and second transitions in said one of the first and second logic signals respectively when said other one of the first and second logic signals is at the second and first logic levels, and
up-down counting means for counting up the first pulses and counting down the second pulses thereby deriving a pulse count representative of said distance.

For instance, the first pulses are generated when the phase of the demodulated signals rises and the distance between the stations increases, and the second pulses are generated when the phase of the demodulated signals drops and the distance decreases. Under these conditions, the count in the up-down counting means is incremented by the first pulses and decremented by the second pulses.

BRIEF DESCRIPTION OF THE DRAWINGS

Further features and advantages of the present invention will be apparent from the following description of several preferred embodiments of the invention as illustrated in the corresponding accompanying drawings in which:

FIG. 6 is a block diagram of a digital processing circuit according to a second embodiment of the invention.

DESCRIPTION OF THE PREFERRED EMBODIMENTS

Figure 1:
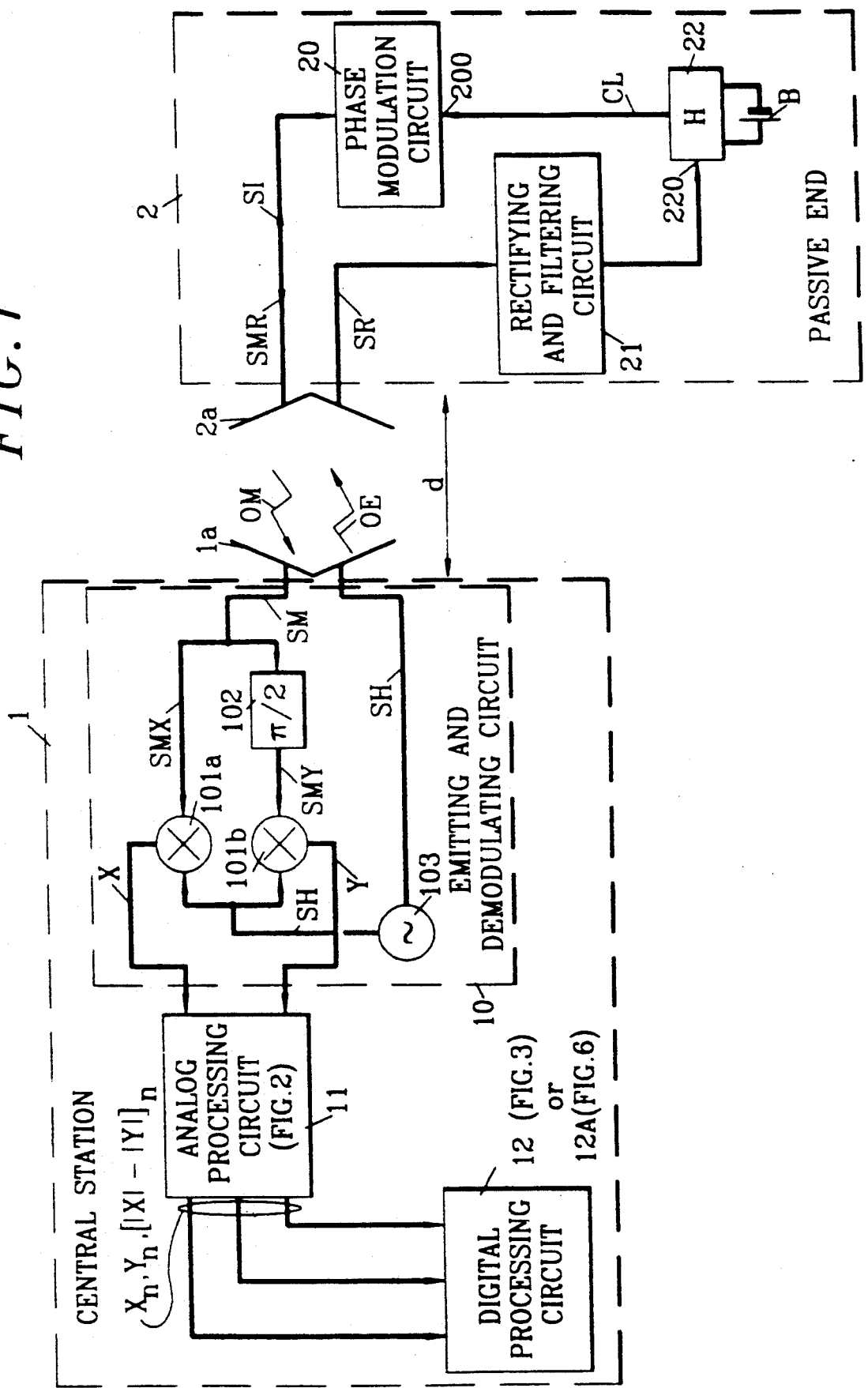
FIG. 1 is a schematic block diagram of a system for measuring the distance between two stations.

With reference to FIG. 1, a distance d between a first station, such as a central station 1, and a second station, such as a terminal station of the passive end type 2, is measured by means of specific circuits belonging to said above-mentioned station and end. The central station 1 comprises an emitting and demodulating circuit 10, an analog processing circuit 11, a digital processing circuit 12 and an antenna 1a. The passive end 2, also referred to as the marker, includes a phase modulation circuit 20, a rectifying and filtering circuit 21, a clock 22, a battery B and an antenna 2a.

The emitting and demodulating circuit 10 and the passive end 2 are substantially similar to those disclosed in U.S. Pat. No. 4,956,645 with regard to radio systems for data transmission, the operating of which is recalled hereinunder.

The emitting and demodulating circuit 10 comprises two mixers 101a and 101b, a shift-by-$\pi/2$ phase shifter 102 and a microwave local oscillator 103. Two first inputs of the mixers 101a and 101b are connected to a reception region of the antenna 1a directly and via the shift-by-$\pi/2$ phase shifter 102, respectively, while two second respective inputs of the mixers 101a and 101b receive a microwave signal SH produced by the microwave local oscillator 103. Outputs of the two mixers 101a and 101b are connected to respective inputs of the analog processing circuit 11. The microwave signal SH constitutes a carrier signal also applied to an emission region of the antenna 1a. The antenna 1a of the central station 1 is e.g. a two-dimensional antenna with square-shaped printed patterns, the patterns having sides of dimension equal to $\lambda/2$, where $\lambda$ is the wavelength of the microwave signal SH. The emission and reception regions of the antenna 1a each consist in e.g. two square-shaped patterns connected together and printed on a same two-sided printed plate. The two demodulators 101a and 101b and the shift-by-$\pi/2$ phase shifter 102 can be supported by the printed plate.

The operating of the measurement system embodying the invention including central station 1 and passive end 2 will now be described globally in reference to FIG. 1.

The local oscillator 103 generates the microwave signal SH at carrier frequency F corresponding to the wavelength $\lambda$. The signal SH is applied to the emission region of antenna 1a to provide an emission wave OE emitted over the distance d separating antenna 1a from antenna 2a of passive end 2. The antenna 2a consists e.g. in a plane antenna including a single squareshaped pattern printed on a small two-sided printed plate. The antenna 2a receives the emission wave OE. Separate first and second transmission lines respectively connect antenna 2a to an input of the phase modulation circuit 20 and to an input of the rectifying and filtering circuit 21. The output of circuit 21 is connected to a supply input 220 for power-supplying the clock 22. The output of clock 22 is connected to a switching control input 200 of the phase modulation circuit 20. The antenna 2a produces a microwave signal SR in the first line connected to the rectifying and filtering circuit 21 when receiving the emission wave OE. The rectifying and filtering circuit 21 is a conventional circuit, e.g. of the rectifying diode and filtering capacitor type, and rectifies and filters the signal SR for providing a d.c. supply voltage 220 for clock 22 for at least partially powersupplying the latter. When supplying from circuit 21, clock 22 applies a digital signal which, according to the invention, is a clock signal CL to input 200. The miniature electric battery B is used, if necessary, for providing an additional DC voltage to the clock 22.

The phase modulation circuit 20 may comprise e.g. a field effect transistor. An incident signal SI with carrier frequency F is supplied by antenna 2a to the passive end 2 in the second line in response to the reception of the emitted wave OE and is applied to the drain of said transistor. The source of the transistor is grounded while the gate of the transistor receives the clock signal CL. As the clock 22 is activated upon receipt of the emitted wave OE, the clock signal CL is at a high voltage level during first half-periods; the transistor is saturated and the second line receiving the incident signal SI is terminated by a quasi-short circuit. At the level of this quasi-short circuit, the electric field of the incident signal SI is reflected as a signal SMR and meets the limit requirements, by having an opposite phase to that of the incident electric field. Conversely, during second half-periods, when the clock signal has a low voltage level, the field effect transistor in the circuit 20 is turned off and the second line is terminated by a quasi-open circuit; the electric field of the signal SI is reflected in phase with the incident signal. In this way, and respectively during the first and second half clock periods CL, the reflected signal SMR is a phase-modulated signal of which the carrier wave derived from the incident signal SI has phase shifts of 0 and $\pi$ in response to the low and high levels of the clock signal CL. This reflected signal SMR is transmitted to the antenna 2a for being broadcast as a modulated wave OM towards the antenna 1a of the emitting and demodulating circuit 10 in central station 1.

In response to the modulated wave OM picked up by the reception region of antenna 1a, a modulated signal SM is applied to the two first inputs of the two mixers 101a and 101b respectively directly and through the shift-by-$\pi/2$ phase shifter 102. The two second inputs of the mixers receive the microwave signal SH produced by the local oscillator 103. Two demodulated component signals X and Y are also supplied from the outputs of the two respective mixers 101a and 101b to the analog processing circuit 11. The circuit 10 constitutes a coherent demodulating circuit with two conventional type demodulation paths.

Supposing the phase of the microwave signal SH to be a reference phase equal to zero, the signal SH is written in the form of $$SH = \sin(\omega t), \text{ with } \omega = 2\pi F.$$

The signal SH is transmitted as the emitted wave OE for being modulated by the clock signal CL in the phase modulation circuit 20 of passive end 2, and "reflected" as a modulated wave OM for producing the modulated signal SM. The latter is expressed as:

$$SM = \sin(\omega t + \phi + \delta).$$

$\phi$ designates a phase shift which is introduced by an outward and return propagation time delay between the emission of the emitted wave OE and the reception of the modulated wave OM by antenna 1a and which is therefore proportional to the distance d separating station 1 and end 2. $\phi$ denotes the phase shift equal to 0 or $\pi$ introduced by the phase modulation circuit 20 at the frequency of the clock signal CL.

The two signals applied to the two first inputs of the two mixers 101a and 101b can thus be respectively expressed as:

$$SMX = \sin(\omega t + \phi + \delta)$$

$$SMY = \sin(\omega t + \phi + \delta + \pi/2),$$

or $$SMX = \sin(\omega t + \phi + \delta)$$

$$SMY = \cos(\omega t + \phi + \delta)$$

At the respective outputs of the two mixers, the demodulated component signals are expressed in the form of:

$$X = \sin(\omega t) \cdot \sin(\omega t + \phi + \delta)$$

$$Y = \sin(\omega t) \cdot \cos(\omega t + \phi + \delta)$$

By a filtering of the two component signals X and Y performed in the analog circuit 11, and consisting in rejecting the harmonic component having a frequency twice the frequency $F = \omega/2\pi$, two filtered signals are produced and are expressed as:

$$X_F = \cos(\phi + \delta)$$

$$Y_F = \sin(\phi + \delta).$$

Figure 4:
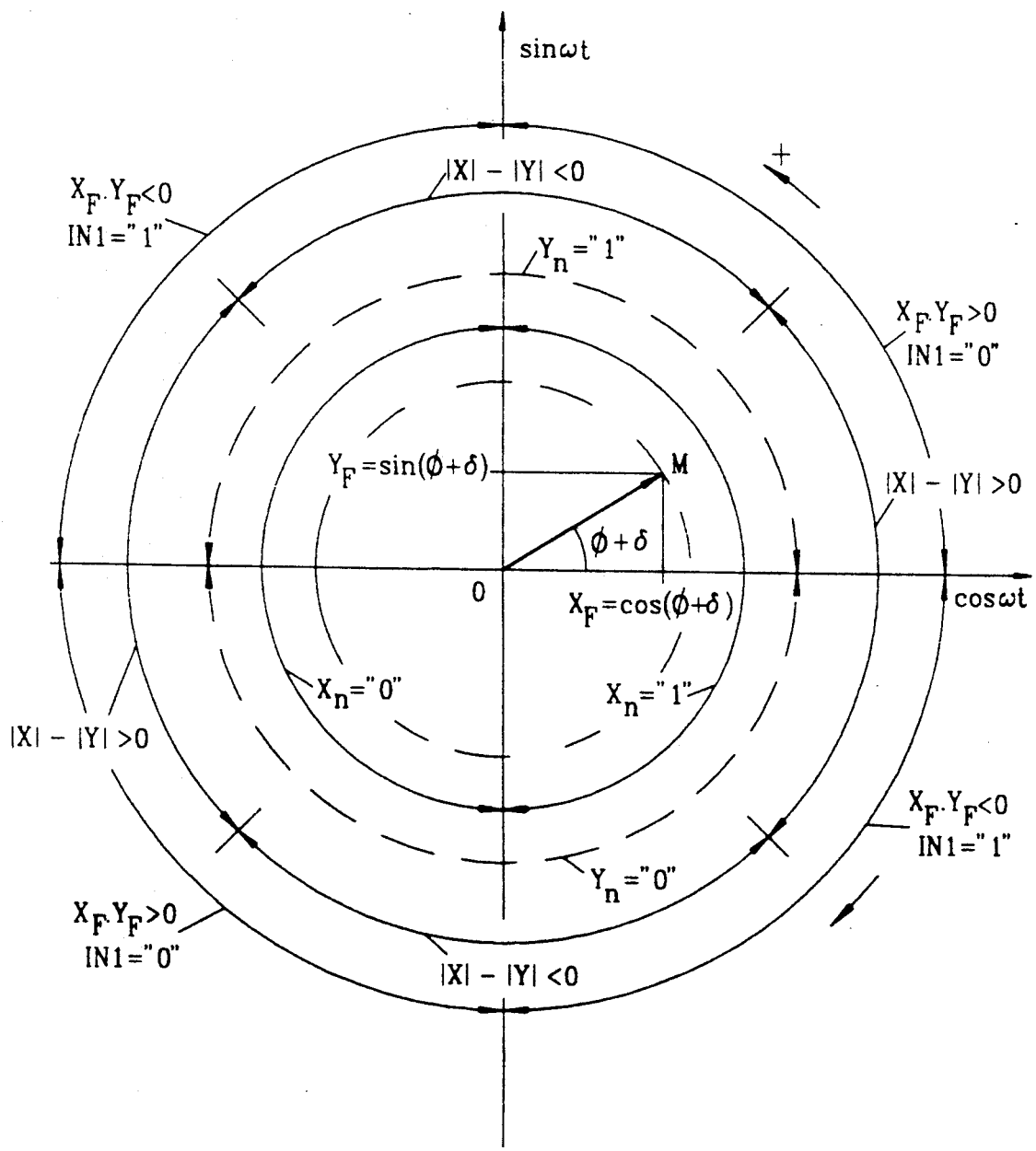
FIG. 4 is a Fresnel diagram for explaining the operation of the measuring system embodying the invention.

Before desorbing the structures and operating of circuits 11 and 12 more precisely, reference is made to FIG. 4 in order to empirically describe the operating of the measuring system embodying the invention.

In the Fresnel diagram shown in FIG. 4, a point M designating the end of a vector $\vec{OM}$ having the center 1 of the diagram as origin and $X_F$ and $Y_F$ as components, moves on a circle of center O as a function of the phase $(\phi + \delta)$ of the two component signals. During a relative displacement of the passive end 2 in relation to the central station I, the phase shift $\phi$ in the phase of the two component signals $X_F$ and $Y_F$ respectively increases and decreases as the end 2 gets further from and nearer to the central station 1. The vector $\vec{OM}$, in this vector chart, turns in one or other direction. According to the invention, the incrementing and decrementing of an up-down counter 126 included in the digital processing circuit 12 are carried out as a function of the direction of rotation of the vector $\vec{OM}$ in order for the content of said up-down counter to be representative at all times of the distance d separating the central station 1 and the passive end 2.

Figure 2:
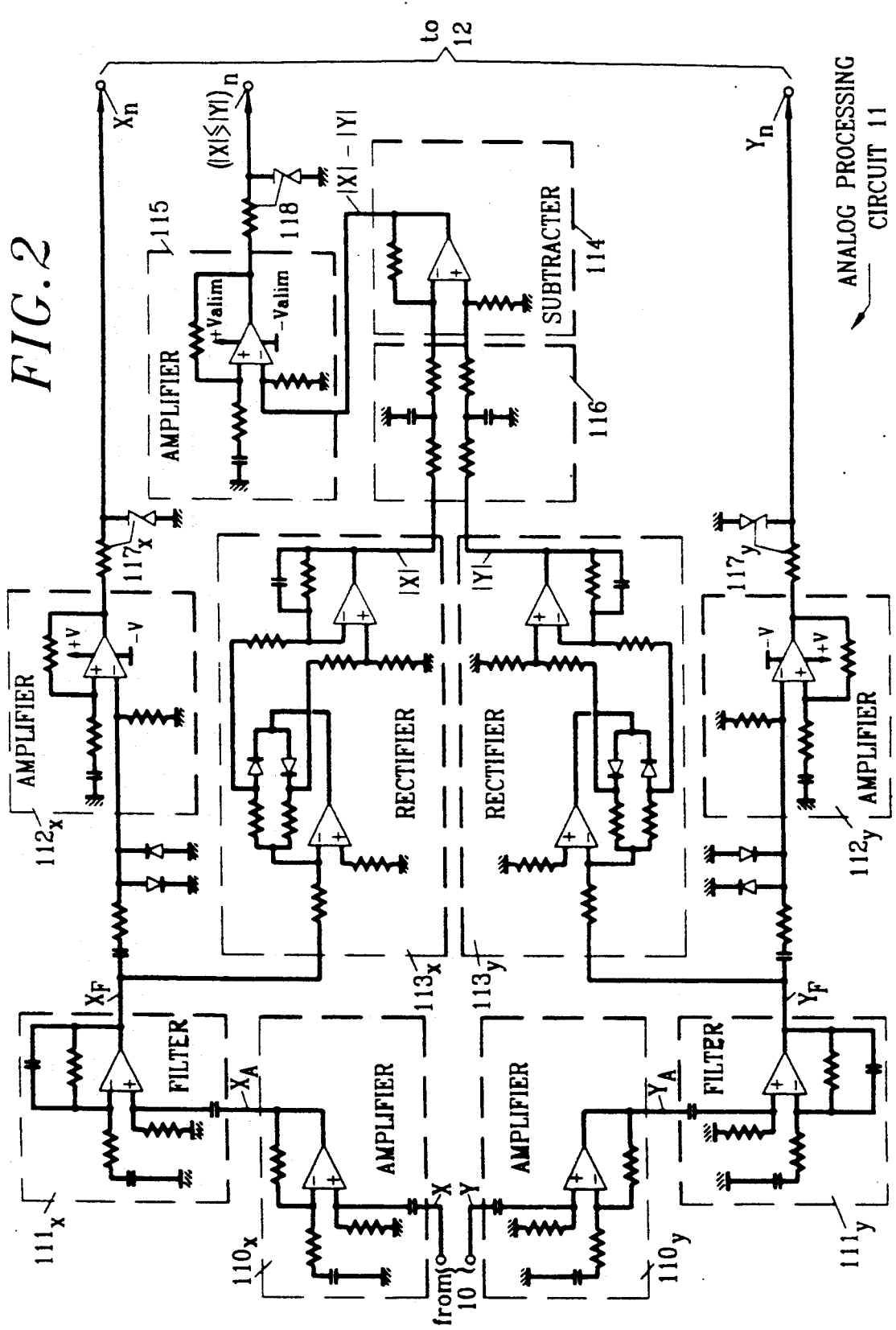
FIG. 2 shows in details an operational amplifier-based analog processing circuit included in one of the stations, such as the central station.

In reference to FIG. 2, the analog processing circuit essentially comprises various elementary functional circuits, such as two positive-preamplification-gain amplifiers $110_x$ and $110_y$, two first-order bandpass filters and $111_y$, two amplifiers $112_x$ and $112_y$, two full-wave rectifiers $113_x$ and $113_y$, a subtractor 114 and an amplifier 115.

It should be noted at this stage that the indices x and y used in the reference numerals of each of the elementary circuits of FIG. 2 are respectively in relation to the two paths of the demodulating circuit 10 carrying the signals X and Y.

In the description hereinunder of the analog circuit illustrated in FIG. 2, the components of each of the elementary circuits are not specified since embodiments of such circuits are known to those skilled in the art. Nevertheless, a more detailed description is provided concerning the elementary circuits which are of interest with regard to the operating of the analog circuit 11 in order to carry out a measurement of the distance according to the invention.

All the previously mentioned elementary circuits are made from operational amplifiers, e.g. of the LF357 type, though they can be designed without operational amplifiers.

In reference to FIG. 2, the outputs of the two preamplification amplifiers $110_x$ and $110_y$ are respectively connected to inputs of the filters $111_x$ and $111_y$. The outputs of the latter are respectively connected to inputs of the amplifiers $112_x$ and $112_y$ and to inputs of the full-wave rectifiers $113_x$ and $113_y$. The outputs of the two rectifiers $113_x$ and $113_y$ are connected to two respective inputs of the subtractor 114 of which the output is applied to the input of the amplifier 115. The outputs of each of the amplifiers $112_x$, $112_y$ and 115 are connected to respective inputs of the digital processing circuit 12 via respective voltage stabilization stages $117_x$, $117_y$ and 118. Each voltage stabilization stage is constituted by a resistance in series with the output of the respective amplifier, and by a grounded parallel Zener diode, and plays a twofold role:

voltage stabilization of the signal derived from the respective amplifier prior to application to digital circuit 12;

generation of a two-level signal, typically 0 V and 5 V, respectively as a function of the output levels of the respective amplifier $-15$ V and 15 V, which is compatible with the logic signals defined in the digital circuit 12.

Moving back to the left of FIG. 2, the two signals X and Y extracted from the two demodulation paths of circuit 10 are applied to the two inputs of the respective preamplification amplifiers $110_x$ and $110_y$ which produce two respective amplified signals $X_A$ and $Y_A$ supplied to the respective bandpass filters $111_x$ and $111_y$. The two filters $111_x$ and $111_y$ each have a frequency band centered on the frequency of the clock signal generated by the clock 22 included in the passive end 2 shown in FIG. 1. The rejection of the harmonic components of signals $X_A$ and $X_B$ at frequency twice the frequency F of the local oscillator 103, obtained by coherent demodulation, is performed naturally by the low-frequency amplifiers $110_x$ and $110_y$.

The two filters $111_x$ and $111_y$ respectively produce the two filtered signals $X_F$ and $Y_F$:

$$X_F = \cos(\phi + \delta)$$

$$Y_F = \sin(\phi + \delta)$$

to within a multiplicative coefficient, determined by the preamplification amplifiers $110_x$ and $110_y$.

The filtered signals $X_F$ and $Y_F$ are applied to the respective inputs of the two amplifiers $112_x$ and $112_y$. The two amplifiers $112_x$ and $112_y$ are designed to operate in non-linear condition. For this purpose, respective suitable components included in the amplifiers $112_x$ and $112_y$ are provided to confer high gains on the latter. In this way, when the filtered signal $X_F$, respectively $Y_F$, is substantially more than zero, the signal derived from the amplifier $112_x$, respectively $112_y$, operating in non-linear condition, has a voltage level equal to the positive supply voltage +Valim of the operational amplifier included in the amplifier $112_x$, respectively $112_y$. Conversely, when the filtered signal $X_F$, respectively $Y_F$, is substantially less than zero, the signal derived from the amplifier $112_x$, respectively $112_y$, has a voltage level equal to $-$Valim, the "negative" supply voltage of said operational amplifier. The signals outgoing from the amplifiers $102_x$ and $102_y$ are respectively applied to the two voltage stabilization stages $117_x$ and $117_y$ which produce digital signals $X_n$ and $Y_n$ having first and second voltage levels +0 volts and +5 volts corresponding respectively to the first and second logic levels "0" and "1" defined in circuit 12. The signals $X_n$ and $Y_n$ are thus representative of the signs of the demodulated and filtered signals $X_F$ and $Y_F$.

In reference to FIG. 4, four angular sectors corresponding to plane angles are indicated around the circle in the Fresnel diagram; two are schematized by half-circles in continuous lines, two by half-circles in broken lines. The digital signal $X_n$ derived from the voltage stabilization stage $117_x$ has the second logic level "1" when the filtered signal $X_F$ applied to the input of the amplifier $112_x$ has an amplitude that is more than zero or positive. Conversely, the digital signal $X_n$ has the first voltage level "0" when said filtered signal $Y_F$ has an amplitude that is less than zero or negative. As shown in FIG. 4, the two half-circles in continuous lines defined in intervals $[\pi/2, -\pi/2]$ and $[-\pi/2, \pi/2]$ respectively correspond to the first and second logic levels of the signal $X_n$. Similarly, the digital signal $Y_n$ offers logic levels "1" and "0" when the filtered signal $Y_F$ applied to the input of the amplifier $112_y$ has an amplitude that is respectively more and less than zero, which corresponds to the two half-circles in continuous lines $[0, \pi]$ and $[-\pi, 0]$.

The filtered signals $X_F$ and $Y_F$ are also applied to the two respective full-wave rectifiers $113_x$ and $113_y$ for producing rectified signals $|X|$ and $|Y|$ representative of the moduli of the signals $X_F$ and $Y_F$. The two rectified signals $|X|$ nd $|Y|$ are applied to two respective inputs of the subtractor 114 producing a modulus difference signal $(|X|-|Y|)$, equal to the difference between the rectified signals $|X|$ and $|Y|$. A double smoothing cell 116 can be interposed between the outputs of the full-wave rectifiers $113_x$ and $113_y$ and the subtractor 114 to perfect the rectification. The difference signal $(|X|-|Y|)$ is applied to the input of the amplifier 115 followed by the voltage stabilization stage 118. The amplifier 115 is of a type similar to amplifiers $112_x$ and $112_y$. At output of the voltage stabilization stage 118, a digital switching signal $(|X|\lessgtr|Y|)_n$ is obtained, defined by:

$(|X|\lessgtr|Y|)_n =$ "1" when $(|X|-|Y|) \geq 0$ and $(|X|\lessgtr|Y|)_n =$ "0" when $(|X|-|Y|) < 0$ This means that, for positive and negative values of the modulus difference signal $(|X|-|Y|)$, the digital switching signal $(|X|\lessgtr|Y|)_n$ is respectively at the second level "1" and at the first level "0", as indicated by two pairs of quadrants $[7\pi/4, \pi/4]$, $[3\pi/4, 5\pi/4]$ and $[\pi/4, 3\pi/4]$, $[5\pi/4, 7\pi/4]$ in FIG. 4.

Figure 3:
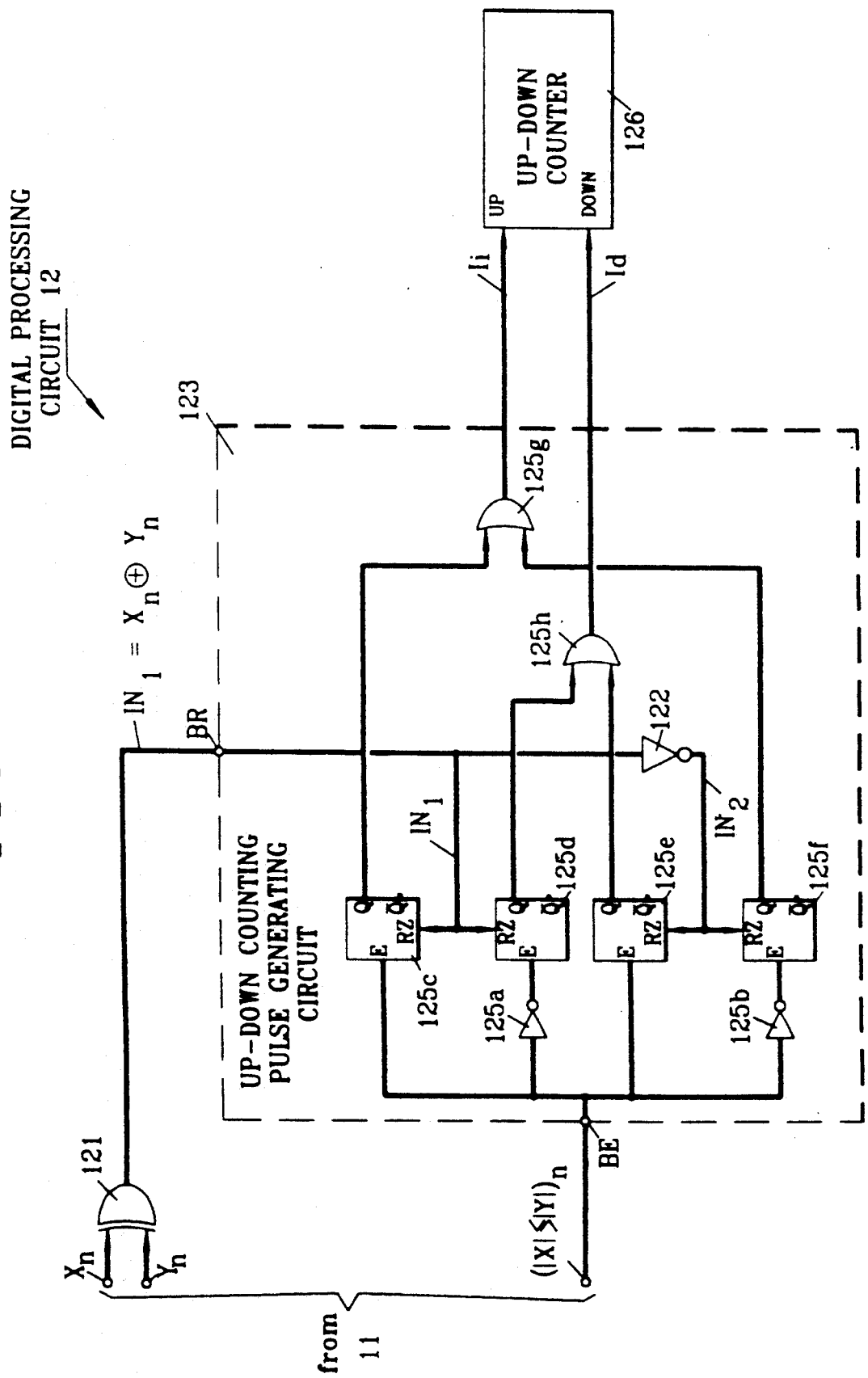
FIG. 3 shows in details a monostable flip-flop-based digital processing circuit included in the central station.

With reference to FIG. 3, the digital processing circuit 12 will now be described. The circuit 12 comprises a two-input XOR gate 121, an up-down counting pulse generating circuit 123 and an up-down counter 126.

The digital signals $X_n$ and $Y_n$ are applied to the two inputs of the XOR gate 121 which produces a first logic signal also called first inhibition signal $IN_1$. In reference to FIG. 4, it should be noticed that the levels of the first inhibition signal $IN_1$ are representative of the sign of the product of signals $X_F$ and $Y_F$. According to the preferred embodiment described here, the signal $IN_1$ has first and second logic levels "0" and "1" respectively when the product of signals $X_F$ and $Y_F$ is positive and negative.

The signal $IN_1$ is applied to a reset terminal BR of circuit 123, whereas the signal $(|X|\lessgtr|Y|)_n$ is applied to an input terminal BE of the circuit 123.

The up-down counting pulse generating circuit 123 comnprises three logic inverters 122, 125a and 125b, four monostable flip-flops 125c, 125d, 125e and 125f and two two-input OR gates 125g and 125h. The four monostable flip-flops of circuit 125 are coupled in couples 125c-125d and 125e-125f, by common links of their respective reset inputs RZ. The inputs E of the first flip-flops 125c and 125e in each of the couples are connected to the terminal BE and receive the logic signal $(|X|\lessgtr|Y|)_n$ directly. The inputs of the second flip-flops 125d and 125f receive the signal $(|X|\lessgtr|Y|)_n$ respectively via the terminal BE and the inverters 125a and 125b. The first flip-flops 125c and 125e, called direct-input flip-flops, detect first transitions from the first level "0" to the second level "1" in the switching signal $(|X|\lessgtr|Y|)_n$ to derive pulses. A duration T of these pulses depends on resistive-capacitive circuits (not represented) in the monostable flip-flops. It should be noted at this stage that resistive-capacitive circuits are chosen for each of the flip-flops in order for the latter to derive pulses of sufficient width to enable the count of an up-down counter 126 to be incremented or decremented, as will be seen hereinafter. The second flip-flops 125d and 125f, called inverted-input flip-flops, detect second transitions from the second level "1" to the first level "0" in the switching signal $(|X|\lessgtr|Y|)_n$ also to derive pulses.

The outputs Q of first and second monostable flip-flops 125c and 125d of the first couple are respectively combined with the outputs Q of the second and first monostable flip-flops 125f and 125e of the second couple for being respectively connected to the inputs of the OR gates 125g and 125h. Supposing each common reset link RZ of each couple of flip-flops does not receive any signal at the second level "1", pulses at the second level "1" Ii and Id are obtained at the outputs of the OR gates 125g and 125h in response to the first and second transitions of the signal $(|X|\lessgtr|Y|)_n$, the durations of these pulses being determined by the resistive-capacitive circuits which are included in the flip-flops and are preferably identical. The outputs of the OR gates 125g and 125h are respectively connected to incrementation UP and decrementation DOWN inputs of the up-down counter 126. According to the embodiment illustrated, the output of the XO gate 121 is connected via the terminal BR to the reset links of the first and second couples of monostable flip-flops 125c-125d and 125e and 125f respectively directly and through the logic inverter 122. In this way, the reset link of the first couple receives the first inhibition signal $IN_1$ while the reset link of the second couple receives the complementary signal of signal $IN_1$, called second inhibition signal $IN_2$.

Figure 5A:
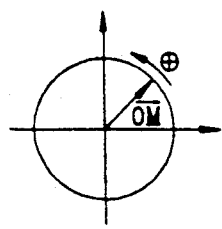
FIGS. 5A and 5B show two time charts relating to the operating of the digital processing circuit.
Figure 5A:
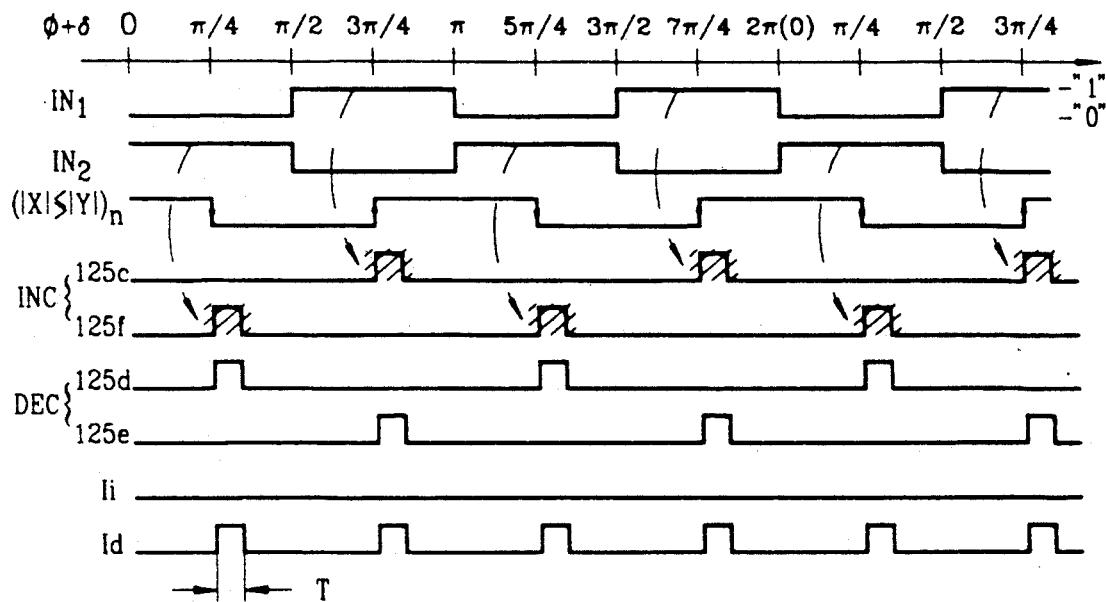
Figure 5B:
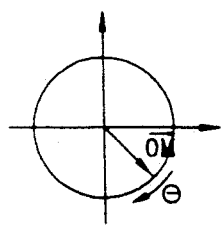
Figure 5B:
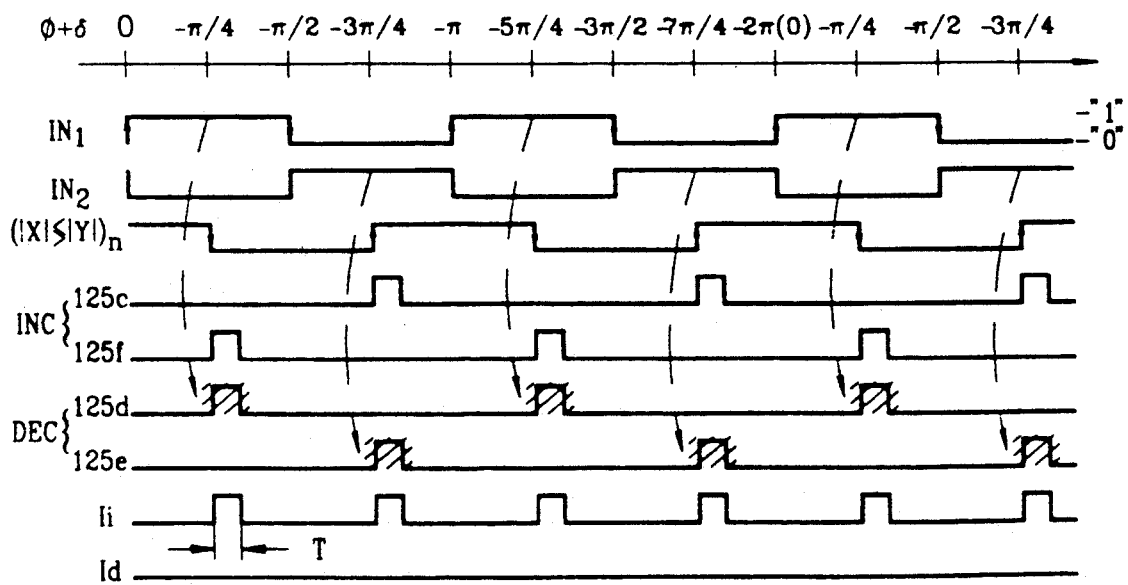

In reference to FIGS. 5A and 5B, the two time charts show the operating of the digital processing circuit 12 for the two displacement directions in relation to the central station 1 and the passive end 2 corresponding to a relative nearing and moving away.

In the first time chart in FIG. 5A, it is supposed that the vector $\vec{OM}$ rotates in the positive trigonometrical direction, in relation to a given direction of displacement between the central station 1 and the passive end 2. The two first lines of the time chart show the respective states of the first and second inhibition signals $IN_1$ and $IN_2$ applied respectively to the reset links of the first and second couple of flip-flops, as a function of the phase $(\phi + \delta)$ of the vector $\vec{OM}$. A third line shows the value of the digital signal $(|X|\lessgtr|Y|)$ applied to the input of the up-down counting pulse generating circuit 123 as a function of the phase $(\phi + \delta)$. The fourth and sixth lines shown the respective pulses produced by the first and second flip-flops of the first couple 125c–125d while the fifth and seventh lines relate to the pulses produced by the second and first flip-flops of the second couple 125e–125f.

The outputs of flip-flops of the first couple 125c–125d are inhibited by the second level "1" of first inhibition signal $IN_1$, and the outputs of flip-flops of the second couple 125e–125f are inhibited by the second level "1" of second inhibition signal $IN_2$. The pulses derived by flip-flops 125c and 125f are respectively inhibited by the second levels "1" of the first and second inhibition signals $IN_1$ and $IN_2$, as indicated by arrows in broken lines and by hatched pulses in FIG. 5A. In this way, only the pulses derived by the flip-flops 125d and 125e which are combined in the OR gate 125h into decrementation pulses Id applied to the input DOWN of the up-down counter 126, decrement a count in the up-down counter 126.

The time chart in FIG. 5B relates to a direction of rotation of the vector $\vec{OM}$ according to the negative trigonometrical direction and corresponding to a relative displacement in the opposite direction to that above-described between the central station 1 and the passive end 2. Opposite results to those previously indicated are obtained, and only incrementation pulses Ii leaving the OR gate 125g are applied to the input UP of the up-down counter 126.

The resolution of such a system depends on four incrementations or decrementations which are a function of the direction of relative displacement between the central station 1 and the passive end 2, i.e., on an increase or a decrease of the phase $(\phi + \delta)$ by $2\pi$. The resolution of the system is "adjustable" by modification of the oscillation frequency F of the oscillator 103 of the central station 1.

The digital processing circuit 12A shown in FIG. 6 further enhances the resolution of the distance measurement system.

The circuit 12A comprises, as in circuit 12, an XOR gate 121A, a first up-down counting pulse generating circuit 123A and an up-down counter 126A, and in addition, a second up-down counting pulse generating circuit 123B, an inverter 127 and two two-input OR gates 128i and 128d.

The circuits 123A and 123B are identical to the circuit 123 shown in FIG. 3, and thus each comprise two couples of monostable flip-flops with direct input and inverse input, and two two-input OR gates.

The terminals BEA and BRA of first circuit 123A relating to the inputs of the monostable flip-flops and to the reset inputs respectively receive the signal $(|X| \lessgtr |Y|)_n$ from the analog processing circuit 11, and the product signal $IN_1$ from the output of the gate 121A identical to gate 121, as with circuit 123. As a result, incrementation pulses IAi and decrementation pulses IAd are produced by two outputs of circuit 123A and are identical to the pulses Ii and Id.

Unlike the first up-down counting pulse generating circuit 123A, the second circuit 123B has input terminal BEB which relates to the inputs E of the four monostable flip-flops and which receives the signal $IN_1$, and reset terminal BRB which receives the complementary signal of signal $(|X| \lessgtr |Y|)_n$ via the inverter 127.

In view of the fact that the transitions in the signals $IN_1$ and $(|X| \lessgtr |Y|)_n$ are offset with regard to one another by $\pi/4$, the incrementation pulses IBi and IBd from outputs of the second circuit 123B are offset by $\pi/4$ with regard to the pulses IAi and IAd from outputs of the first circuit 123A. Furthermore, since the role of signals $IN_1$ and $(|X| \lessgtr |Y|)_n$ are reversed in circuits 123A and 123B, the decrementation pulses IAd and IBd are derived by the gates 125h included in circuits 123A and 123B upon relative displacement of the stations corresponding to a rotation of the vector $\vec{OM}$ in the positive trigonometrical direction (FIG. 5A), while incrementation pulses IAi and IBi are derived by the gates 125g included in the circuits 123A and 123B upon relative displacement of the stations in the opposite direction to above, corresponding to a rotation of the vector $\vec{OM}$ in the negative trigonometrical direction (FIG. 5B).

The pulses IAi and IBi are applied to the inputs of gate 128i of which the output is connected to the incrementation input UP of the up-down counter 126A. The pulses IAd and IBd are applied to the inputs of gate 128d of which the output is connected to the decrementation input DOWN of the up-down counter 126A. Under these conditions, eight pulses offset by $\pi/4$ are applied to one of the inputs of the up-down counter 126A during a displacement corresponding to a variation of the phase $(\phi + \delta)$ by $2\pi$. The resolution of the measuring system including circuit 12A is thus enhanced by a factor two compared with the system equipped with circuit 12.

It should be noted that a further embodiment of the digital processing circuit can include circuit 123B with inverter 127 instead of circuit 123, identical to 123A, in FIG. 3.

What we claim is:

1. A system for measuring a distance between first and second stations mobile with regard to one another, said second station comprising means for modulating a carrier signal emitted from said first station by a digital signal into a two-phase-state modulated signal which is transmitted to said first station, and said first station comprising:

means for demodulating and filtering said two-phase-state modulated signal into two phase-quadrature demodulated and filtered signals, means for deriving a first logic signal having logic levels dependent on the sign of a product of said two phase-quadrature demodulated and filtered signals means for deriving a second logic signal having logic levels dependent on the sign of the difference of the moduli of said two phase-quadrature demodulated and filtered signals, first means for generating first and second pulses respectively in response to first and second transitions in one of the first and second logic signals respectively when the other one of the first and second logic signals is at first and second logic levels, and in response to said first and second transitions in said one of the first and second logic signals respectively when said other one of the first and second logic signals is at said second and first logic levels, and up-down counting means for counting up said first pulses and counting down said second pulses thereby deriving a pulse count representative of said distance.

2. The system as claimed in claim 1, wherein said first pulses generating means comprises a first couple of first and second means for respectively detecting said first and second transitions in said one of the first and second logic signals thereby deriving transition detection pulses when said other one of the first and second logic signals is at said first logic level, a second couple of first and second means for respectively detecting said first and second transitions in said one of the first and second logic signals thereby deriving transition detection pulses when said other one of the first and second logic signals is at said second logic level, first means for combining said detection pulses derived by said first detecting means in said first couple and by said second detecting means in said second couple into said first pulses, and second means for combining said detection pulses derived by said second detecting means in said first couple and by said first detecting means in said second couple into said second pulses.

3. The system as claimed in claim 2, wherein each of said first and second detecting means comprises a monostable flip-flop, said monostable flip-flops in said first and second detecting means in each of said couples respectively receiving directly and via an inverter means said one of the first and second logic signals, and said monostable flip-flops in said first and second couples being respectively reset in response to said second and first logic levels of the other one of the first and second logic signals.

4. The system as claimed in claim 1, wherein said digital signal modulating said carrier signal in said second station is a clock signal.

5. A system for measuring a distance between first and second stations mobile with regard to one another, said second station comprising means for modulating a carrier signal emitted from said first station by a digital signal into a two-phase-state modulated signal which is transmitted to said first station, and said first station comprising:

means for demodulating and filtering said two-phase-state modulated signal into two phase-quadrature demodulated and filtered signals, means for deriving a first logic signal having logic levels dependent on the sign of a product of said two phase-quadrature demodulated and filtered signals, means for deriving a second logic signal having logic levels dependent on the sign of the difference of the moduli of said two phase-quadrature demodulated and filtered signals, first means for generating first and second pulses respectively in response to first and second transitions in one of the first and second logic signals respectively when the other one of the first and second logic signals is at first and second logic levels, and in response to said first and second transitions in said one of the first and second logic signals respectively when said other one of the first and second logic signals is at said second and first logic levels, second means for generating first and second pulses respectively in response to first and second transitions in said other one of the first and second logic signals respectively when said one of the first and second logic signals is at first and second logic levels, and in response to said first and second transitions in said other one of the first and second logic signals respectively when said one of the first and second logic signals is at said second and first logic levels, and up-down counting means for counting up said first pulses generated by said first and second generating means and counting down said second pulses generated by said first and second generating means thereby deriving a pulse count representative of said distance.

6. The system as claimed in claim 5, wherein said first and second pulse generating means each comprise a first couple of first and second means for respectively detecting said first and second transitions in said one, respectively said other one, of the first and second logic signals thereby deriving transition detection pulses when said other one, respectively said one, of the first and second logic signals is at the first logic level, a second couple of first and second means for respectively detecting said first and second transitions in said one, respectively said other one, of the first and second logic signals thereby deriving transition detection pulses when said other one, respectively said one, of the first and second logic signals is at said second logic level, first means for combining said detection pulses derived by said first detecting means in said first couple and by said second detecting means in said second couple into said first pulses, and second means for combining the detection pulses derived by said second detecting means in said first couple and said first detecting means in said second couple into said second pulses.

7. The system as claimed in claim 6, wherein each of said first and second detecting means comprises a monostable flip-flop, said monostable flip-flops in said first and second detecting means in each of said couples of said first and second respective pulse generating means respectively receiving directly and via an inverter means said one, respectively said other one, of the first and second logic signals, and said monostable flip-flops in said first and second couples being respectively reset in response to said second and first logic levels of said other one, respectively said one, of the first and second logic signals.

* * * * *